United States Patent [19]

Moore

[11] Patent Number: 6,120,815

[45] Date of Patent: Sep. 19, 2000

[54] PALATABLE ANIONIC FEED MINERAL CONCENTRATE

[75] Inventor: William P. Moore, Hopewell, Va.

[73] Assignee: Agri-Nutrients Technology Group, Inc., Disputanta, Va.

[21] Appl. No.: 09/429,706

[22] Filed: Oct. 29, 1999

[51] Int. Cl.[7] .................................................... A23K 1/175
[52] U.S. Cl. ........................... 426/74; 426/656; 426/658; 426/807
[58] Field of Search .............................. 426/74, 656, 658, 426/807

[56] References Cited

U.S. PATENT DOCUMENTS

| | | | |
|---|---|---|---|
| 5,360,823 | 11/1994 | Ariffel, Jr. et al. | 514/706 |
| 5,556,634 | 9/1996 | Moore | 424/438 |
| 5,686,125 | 11/1997 | Mueller | 426/74 |

FOREIGN PATENT DOCUMENTS

98/49903   11/1998   WIPO .

Primary Examiner—Chhaya D. Sayala

[57] ABSTRACT

A four step method of preparing palatable anionic mineral feed concentrate granules which form storage stable blends with feed rations to prevent parturient paresis in commercial breeding animals, with the four steps comprising: metathetically reacting ammonium sulfate with a molecular excess of magnesium chloride in acidic water to form an ammonium chloride, magnesium sulfate, magnesium chloride anionic salt solution; mixing the anionic solution with comestible proteinaceous feed particles to form damp concentrate particles; mixing the damp concentrate particles with a palatability enhancing molasses binder to form damp concentrate granules; and, drying the granules to form dry palatable anionic feed mineral concentrate granules which exhibit an excess of the strong anions, chloride and sulfate, over the strong cations, sodium and potassium. The attrition resistant granular concentrate composition may be effectively blended with animal feeds to form storage stable feed rations for commercial breeding animals for preventing parturient paresis.

25 Claims, No Drawings

PALATABLE ANIONIC FEED MINERAL CONCENTRATE

BACKGROUND OF THE INVENTION

1. Field of the Invention

This invention relates to animal feed minerals and methods for their effective preparation in concentrated, palatable form, for storage stable blending with animal feeds. More particularly, it relates to a method of preparation, and the palatable anionic feed mineral concentrate composition prepared thereby, for prevention of parturient paresis in commercial breeding animals. The improved method is achieved by the metathetical reaction of ammonium sulfate with a molecular excess of magnesium chloride in aqueous solution, mixing the reacted solution with proteinaceous comestible particles, and binding the mixed particles into granules with a palatability enhancing molasses binder.

2. Description of Related Art

In recent years, dairy scientists have found that parturient paresis, sometimes called milk fever, may be prevented by feeding anionic salts in an acidogenic diet in the 3–6 week period prior to calving. The surplus of strong anions over strong cations results in a series of physiological events which may be described as the anionic effect. Some of these events include: increased calcium absorption in the intestines, mobilization of calcium in the bones to help neutralize the strong anions fed, and reduced blood pH.

The benefits of the anionic salts have been experienced commercially primarily in dairy cattle up to the present time. Other ruminant animals, such as sheep and goats, although less important commercially than cattle receive similar benefits. Recently non-ruminant swine have shown the benefits of anionic salts for prevention of parturient paresis.

Anionic salts, as described herein are salt mixtures wherein the combined strong anions outnumber the combined strong cations. The important strong cations used in feed minerals comprise sodium and potassium and the strong anions comprise chloride and sulfate. Magnesium, calcium, and ammonium are cations which form important minerals in animal nutrition but are not strong cations.

In my U.S. Pat. No. 5,556,634, an inorganic anionic salt composition was disclosed for preventing parturient paresis where the pH of the anionic salt was near-neutral. A method of preparing this anionic salt was provided which required the reaction of magnesium and calcium chlorides with a molecular excess of ammonium sulfate in a liquid phase to produce particles of magnesium sulfate, calcium sulfate, and ammonium chloride, homogeneously combined with the excess ammonium sulfate.

For optimum performance and safety of commercial breeding animals, the mineral compositions of the feed rations which the animals receive must be formulated accurately and the formulation must be stable. The formulation storage stability is necessary to prevent concentrated minerals, such as the anionic salts, from separating from the feed rations because of different particle sizes, shapes, densities, or friction factors. Storage stability may be compromised also by the feeding animal's pushing away anionic salt concentrates with different taste, smell, shapes, and colors. The concentrates must also be palatable or the breeding animal will not consume the material.

In the feeding of commercial breeding animals, it is convenient, and the usual manner of feeding, to provide minerals in the form of a concentrate which must then be accurately blended with the remainder of the feed rations. The feed minerals must reach the feed rations intact and then must not separate during storage or handling. To function in an optimum manner the mineral concentrates must exhibit good physical integrity, homogeneity and physical properties similar to those of the feed rations without dusting or clumping.

The inorganic anionic salt compositions of U.S. Pat. No. 5,556,634 are usable and palatable when completely blended with animal feed rations. When the blended feed rations are stored, the concentrates absorb moisture and cause the blended feed ration to clump. When the inorganic anionic salts are poured on top of a feed ration without thorough mixing, the animals push the concentrate granules aside and do not consume it.

In the instant disclosure the term "anionic mineral concentrate" means a mineral feed composition containing an excess of strong anions over strong cations. Weak cations and anions are not considered part of this term. The term "molecular excess of alkaline earth chlorides" means that more than enough alkaline earth chloride molecules are available to metathetically react with all the available ammonium sulfate. "Comestible" herein means esculent, safe for animal consumption and eatable. All percents and parts are by weight unless expressly stated to be otherwise. The term "storage stable" granules is used herein to mean that the granules will not segregate from animal feed rations; will not absorb moisture and become sticky; and will not cause clump formation in animal feed rations to which the granules are added. The term "metathetical reaction" is used herein to mean the exchange of atoms or ions between two molecules.

OBJECTS OF THE INVENTION

It is a primary object of this invention to provide a method of preparing anionic mineral feed concentrate granules which will form storage stable blends with feed rations for prevention of parturient paresis in commercial animals.

It is another object of this invention to provide a palatable anionic mineral feed concentrate granule composition which forms storage stable blends with feed rations for feeding to commercial breeding animals for prevention of parturient paresis.

It is another object to provide a continuous method of preparing a palatable anionic mineral feed concentrate granular composition which forms storage stable blends with feed rations for commercial breeding animals.

BRIEF SUMMARY OF THE INVENTION

I have discovered a method of preparing palatable anionic mineral feed concentrate granules, which form storage stable blends with feed rations, for prevention of parturient paresis in commercial breeding animals. The method is initiated surprisingly by the metathetical reaction of ammonium sulfate with a molecular excess of alkaline earth chloride to form an aqueous anionic salt solution containing alkaline earth sulfate, ammonium chloride and unreacted alkaline earth chloride. The molecular excess of alkaline earth chloride is key to the discovery because it allows the anionic salt solution to remain liquid at low temperatures and low water concentrations.

In the instant method the anionic salt solution is blended with comestible proteinaceous particles to form damp feed particles. It was discovered that blending the anionic salt solution and the comestible proteinaceous particles provided concentrate particles which were storage stable and would neither settle out of a feed ration or be brushed aside by a consuming animal.

The damp particles are effectively converted to palatable, attrition resistant granules by admixing a palatability enhancing molasses granule binder, and the method is completed by drying the granules.

When the instant method is applied a palatable anionic mineral feed concentrate granule composition is prepared which forms storage stable blends with feed rations for feeding to commercial breeding animals for prevention of parturient paresis.

DETAILED DESCRIPTION OF THE INVENTION

The instant invention provides a four step method of preparing anionic mineral feed concentrate granules which form storage stable blends with feed rations for prevention of parturient paresis in commercial breeding animals.

In the first of the four steps required, ammonium sulfate is reacted metathetically with a molecular excess of alkaline earth chloride to form an aqueous anionic salt solution comprising alkaline earth sulfate, ammonium chloride, and unreacted alkaline earth chloride.

One part of the anionic salt solution, free of ammonium sulfate particles, is admixed with between 1 and 4 parts of comestible proteinaceous particles until the anionic salt solution is absorbed to form damp particles exhibiting moisture contents between 15 and 30 percent. When the alkaline earth chlorides are used in amounts less than a molecular excess over ammonium sulfate, the damp feed particles formed are not homogeneous and contain undissolved ammonium sulfate crystals.

In step three, a palatability enhancing molasses granule binder, amounting to between 1 and 8 percent of the mineral feed concentrate granules, is admixed with the damp particles until the particles are bound together as damp granules.

In the fourth step the granules are dried to a moisture content of between 3 and 15 percent at a temperature between 60 and 100° C. in a period of time of less than 15 minutes before caramelization of the molasses occurs to destroy the palatability of the mineral feed concentrate granules.

The alkaline earth chlorides found to be effective in the instant methods are magnesium and calcium chlorides. Some of the naturally occurring alkaline earth chloride sources, such as Bischofite, may be quite effectively used. One particularly effective alkaline earth chloride source is primarily magnesium chloride which contains calcium chloride, potassium chloride, and sodium chloride, amounting in total to between 0.5 and 5.0 percent of the magnesium chloride. These alkaline earth chlorides are obtained by partial crystallization-fractionation of naturally occurring brines, such as occur in the Dead Sea and the Great Salt Lake.

In one of the preferred forms of the method, the ammonium sulfate is metathetically reacted with a molecular excess of the alkaline earth chloride, magnesium chloride, in a molecular ratio of between 1.02 and 1.10 molecules of magnesium chloride to 1.00 molecule of ammonium sulfate.

Although calcium is useful and desirable in the mineral salt concentrates an excess of magnesium over the calcium concentrations are preferred. Effective method and product is obtained when the ammonium sulfate is metathetically reacted with a molecular excess of the alkaline earth chlorides magnesium and calcium chlorides wherein the molecular ratios of magnesium to calcium amount to between 2 and 100 to 1.

The metathetical reaction between ammonium sulfate and the molecular excess of alkaline chlorides is carried out in the presence of water to form water solutions. The water may be derived from water of crystallization of salts such as magnesium and calcium chlorides. The presence of small amounts of phosphoric acid forms a buffer with the calcium and magnesium ions primarily to hold the product at a near neutral condition. In a preferred form, the ammonium sulfate is metathetically reacted with a molecular excess of alkaline earth chloride in water which contains phosphoric acid amounting to between 0.2 and 1.0 percent of the mineral feed concentrate granules.

There may be some variations in the amount of water in which the ammonium sulfate is reacted with a molecular excess of alkaline earth chloride, but preferred reaction is carried out in water which amounts to between 30 and 60 percent of the anionic salt solution formed. Less water does not provide for ready combination with the comestible particles and more water causes coating of the drying device.

The ammonium sulfate is reacted effectively with a molecular excess of alkaline earth chloride in water at a temperature between 50 and 100° C. so that the salts are readily dissolved in a period of time between 3 and 30 minutes required to allow the salts to mix together, dissolve and metathetically react to form the anionic solution.

It is preferred to admix 1 part of the anionic solution with between 1.6 and 2.0 parts of comestible proteinaceous feed particles until the salt solution is absorbed to form damp particles having moisture contents between 18 and 23 percent. The particles formed under these preferred conditions, after drying, are storage stable when blended with animal feed rations, and are also palatable.

For the instant method to be effective in forming granules which are storage stable when blended with animal feed rations the damp particles must be granulated and to obtain granulation the comestible proteinaceous particles preferably exhibit particle diameters between 0.2 and 2.0 millimeters. The comestible proteinaceous feed particles preferably contain protein amounting to between 10 and 20 percent of the mineral feed concentrate granules to obtain the granule palatability desired.

The preferred economical comestible proteinaceous particles for use in the instant method are distillers grain, brewers grain, corn gluten meal, dehydrated alfalfa, cell wall concentrates produced as by-products in microbial processes, wheat middlings and soybean hulls.

A variety of palatability enhancing molasses binders may be used in the instant method and those containing between 60 and 94 percent dry matter were effective. More dilute molasses do not provide effective binding, and more concentrated molasses are difficult to mix with the damp comestible particles.

Preferred economical palatability enhancing molasses binders are sugar beet molasses, cane molasses, citrus molasses, wood molasses, and recycled industrial sugar molasses. To obtain good granulation the amount of palatability enhancing binder is preferably limited closely to amounts between 1 and 4 percent of the mineral feed concentrate granules. Higher amounts make the granules sticky and lower amounts provide less than desired resistance to granule attrition. Also, required to achieve the granule physical properties without caramelization of the comestible granules is the drying of the damp granules to a moisture content between 5 and 10 percent.

To obtain anionic mineral feed concentrate granules which are effective for prevention of parturient paresis and palatable, it is preferred that the feed concentrate granules exhibit an excess of the strong anions chloride and sulfate over the strong cations potassium and sodium, amounting to between 5.5 and 8.0 milliequivalents per gram of the mineral feed concentrate granules.

To assure that caramelization does not occur in the comestible particles and that the mineral feed concentrate granules are palatable as animal feeds, it is preferred that the damp granules are dried so that the temperature of the mineral feed concentrate granules does not excess 80° C.

An effective palatable anionic mineral feed concentrate granule composition which forms storage stable blends with feed rations for feeding to commercial breeding animals for prevention of parturient paresis is formed when the four steps of the instant method are performed. The composition is effective for the commercial breeding animals: cattle, sheep, goats, horses, and swine.

The instant method may be carried out in batch or continuous manners. It is economically advantageous to use a continuous method.

In the continuous four step method of preparing a granular palatable anionic mineral feed concentrate composition which forms storage stable blends with feed rations for prevention of parturient paresis in commercial breeding animals the following steps are preferred. Metathetically reacting ammonium sulfate and magnesium chloride in a ratio of 1.00 molecule of ammonium sulfate to between 1.02 and 1.10 molecules of magnesium chloride in water containing phosphoric acid amounting to between 0.2 and 1.0 percent of the anionic mineral feed concentrate, at a temperature between 50 and 100° C. until the ammonium sulfate reacts with the magnesium chloride to form an anionic salt solution comprising ammonium chloride, magnesium sulfate, and unreacted magnesium chloride.

The anionic salt solution is continuously admixed with 1.6 to 3.0 parts of comestible proteinaceous particles exhibiting diameters between 0.25 and 0.85 millimeters, in a ratio of 1.0 part of the anionic salt solution to between 1.6 and 2.0 parts of the comestible particles. The salt solution and the comestible particles are admixed for a period of time between 4 and 18 minutes at a temperature between 30 and 70° C. until damp mineral concentrate particles are formed which exhibit moisture contents between 18 and 23 percent.

The method is continued by admixing a palatability enhancing molasses granule binder, amounting to between 1 and 3 percent of the mineral feed concentrate granules, with the damp mineral concentrate granules until the damp mineral concentrate particles are bound together by the molasses granule binder to form damp granules in a period of time amounting to between 2 and 4 minutes.

The damp granules are then dried to a moisture content of between 5 and 15 percent by means of a continuous dryer wherein granule temperatures do not exceed 96° C., to provide an anionic mineral feed concentrate granular composition exhibiting an excess of the strong anions chloride and sulfate over the strong cations sodium and potassium, amounting to between 5.5 and 8.0 milliequivalents per gram of mineral feed concentrate granules.

In the continuous method it is preferred to add an amount of phosphoric acid in the water, in which the anionic salt solution is formed, sufficient to provide a pH of between 5.0 and 6.5 in the mineral feed concentrate granules.

At times the comestible proteinaceous particles are in poor handling condition and are difficult to get in or out of bins or containers. This type problem may be ameliorated by admixing conditioning powders so that the comestible proteinaceous particles contain between 2 and 10 percent of the conditioners calcium sulfate, magnesium sulfate, diatomaceous earth, Celite, zeolite, Bentonite, and clays.

A particularly efficacious way of performing the continuous admixing of the anionic salt solution and the palatability enhancing molasses granule binder with the comestible proteinaceous particles is performed in a horizontal mixing cylinder. The cylinder contains one, or more, mixing blades, mounted on a central rotating shaft, which throws all mixer contents toward the center of the cylinder, thereby creating a fluidized bed of particles which contains a homogeneous blend of all of the mixer contents. The cylinder is equipped with a dam at its discharge end to control the level retained in the cylinder. The cylinder is also equipped with one, or more, chopper blades mounted on the side wall of the cylinder so that the chopper blades operate perpendicularly to the mixing blades to chop agglomerated granules until they exhibit diameters between 0.5 and 1.5 mm.

The damp granules of the instant method may be continuously dried by convenient and practical drying procedures so long as the granules are not subjected to sufficient temperature and time to cause caramelization of the comestible particles. The continuous dryers effective in the instant method are rotary drum dryers, vibratory fluid bed dryers, hot air fluid bed dryers, vacuum dryers, spray dryers, and steam tube dryers.

It is preferred to admix the anionic salt solution with comestible proteinaceous particles so that the protein content of the mineral feed concentrate amounts to between 10 and 20 percent and the NPN protein equivalent content amounts to between 20 and 30 percent.

The instant continuous method may be operated to produce storage stable mineral feed concentrate granules using no recycle of fines. However, closer control of granule sizes is obtained where the mineral feed concentrate granules are screened to a desired granule size range and the oversize after grinding and the fines are recycled back as a portion of the comestible proteinaceous particles. It is preferred to recycle a part of the dry mineral feed concentrate granules, amounting to between 20 and 60 percent of the concentrate granules, which are comminuted to particles exhibiting diameters between 0.25 and 0.85 millimeters and recycled as a portion of the comestible proteinaceous particles.

A caramelization-free anionic mineral feed concentrate granule composition, which forms storage stable blends with feed rations and is effective for feeding to breeding cows to prevent parturient paresis, is prepared by the instant method.

MODE OF OPERATION OF THE INVENTION

Having described the basic concepts of the instant invention, reference is now made to the following examples which are provided to illustrate the new method of preparing anionic mineral feed concentrate granules and to illustrate the storage stability and efficacy of the granules, prepared by the method, in preventing parturient paresis.

EXAMPLE 1

This example demonstrates the practical and preferred four step continuous method of preparing anionic mineral feed concentrate granules.

In the first step, a stirred glass lined, steam jacketed vessel was used to carry out the metathetical reaction of ammonium sulfate with a molecular excess of magnesium chloride from Bischofite. Charged to the reactor was 480.00 lbs. of Bischofite, 277.00 lbs. of ammonium sulfate, 7.10 lbs. of 0-53-0 phosphoric acid, and 107.00 lbs. water. The mixture was heated to 100° C. and held for 21 minutes until the metathetical reaction between magnesium chloride and ammonium sulfate was completed to form a clear anionic salt solution weighing 871.10 lbs. and having the following composition:

| Components | lbs. |
|---|---|
| $NH_4Cl$ | 224.54 |
| $MgSO_4$ | 252.45 |
| $MgCl_2$ | 12.75 |
| LiCl | 0.38 |
| $CaCl_2$ | 2.69 |
| KCl | 0.38 |
| NaCl | 1.01 |
| $CaSO_4$ | 0.48 |
| $H_3PO_4$ | 6.04 |
| $H_2O$ | 370.38 |
| Total | 871.1 |

In the second step, the clear anionic salt solution was continuously pumped from the stirred glass-lined tank to a continuous Littleford Intensive Mixer-Granulator which consisted of a horizontal mixing cylinder containing four mixing blades mounted on a central rotating shaft, which throws the mixer contents toward the center of the cylinder thereby creating a fluidized bed of particles which contains a homogeneous blend of all of the mixer contents. The cylinder was also equipped with a dam at its discharge end which was used to control the level of material retained in the cylinder. The cylinder fill level was controlled at about 20 percent filled. The cylinder was also equipped with four chopper blades mounted on the side wall of the cylinder and the chopper blades were operated perpendicularly to the mixing blades at 3600 revolutions per minute to chop any agglomerated granules until they exhibited diameters between 0.4 and 0.6 mm.

Also continuously sent to the Littleford Intensive Mixer-Granulator was 1500.00 lbs. of comestible particles, consisting of 700 lbs. of recycled fines, 793.05 lbs. of Distillers Grain/Solubles, and 56.95 lbs. of gypsum solids conditioner, and having the following composition:

| Components | lbs. |
|---|---|
| $NH_4Cl$ | 113.26 |
| $MgSO_4$ | 127.33 |
| $MgCl_2$ | 6.44 |
| LiCl | 0.21 |
| $CaCl_2$ | 1.33 |
| KCl | 0.21 |
| NaCl | 0.49 |
| $CaSO_4$ | 67.53 |
| $CaHPO_4$ | 8.91 |
| $H3PO_4$ | 44.31 |
| Protein | 334.68 |
| Fat | 107.35 |
| Fiber | 47.68 |
| Ash | 87.48 |
| $H_2O$ | 86.96 |

The retention time in the first half of the Littleford Intensive Mixer-Granulator was 4 minutes and temperature was held to 65° C. by pumping water through the jacket on the Littleford. The third step was also carried out in the last half of the continuous Littleford. Cane molasses serving as the palatability enhancing granule binder, amounting to 26.00 lbs., was added continuously in the second half of the Littleford to the damp feed mineral concentrate particles and the mechanical action of the fluid bed and the choppers of the Littleford formed damp granules bound together by the molasses in 4 minutes retention time in the second half of the Littleford.

In the fourth step, the damp granules were dried in a hot air heated rotary drum in which granule temperatures reached 94° C. at the discharge end of the dryer. The attrition resistant anionic mineral feed concentrate granular composition was analyzed with the results listed as follows:

| Components | Wt % |
|---|---|
| Total Crude Protein | 42.50 |
| NPN Crude Protein Equiv. | 26.40 |
| Protein | 16.10 |
| Calcium | 1.22 |
| Magnesium | 3.91 |
| Sulfate (as S) | 5.61 |
| Chloride | 11.61 |
| Fat | 2.28 |
| Fiber | 1.11 |
| Sugars | 4.34 |
| Sodium | 0.03 |
| Potassium | 0.01 |
| Phosphorus | 0.91 |
| Ash | 4.34 |
| Moisture | 5.00 |

Strong Cations – Strong Anions $$(Na + k) - (Cl + S) \quad -6.763 \frac{m.\,equiv.}{gram}$$

After grinding and screening to recover product in the U. S. Std. screen range −12+40, product amounted to 1388.19 lbs. and recycle 700.00 lbs.

EXAMPLE 2

This example demonstrates that the anionic mineral feed concentrate granules form storage stable blends with animal feed rations.

In ration A 24 parts of a complete corn silage based dairy cow feed ration was mixed in a feed bunker with 1 part of the anionic mineral feed concentrate granules prepared in Example 1. In ration B, the inorganic anionic salts as used in the Example 1 preparation were prepared by simple mixing without the comestible Distillers Grain/Solubles and the cane molasses palatability enhancing granule binder. The inorganic anionic salts were then mixed with the same source of corn silage based feed ration as in ration A to provide the same concentration of anionic salts in both rations.

Both feed rations were stored in bunkers for 24 hours and then dumped through a 2 inch screen. It was found that the feed ration receiving the inorganic anionic salts contained lumps which would not pass through the screen as indicated by the following table.

|  | Example 1 Concentrate | Inorganic Concentrate |
| --- | --- | --- |
| Lumps Retained on 2" Screen, Wt % | 2.1 | 15.5 |

When the unscreened feed rations were fed to dairy cows, a large portion of the lumps containing the inorganic anionic salts were pushed aside and not consumed while the granular concentrate remained homogeneously mixed and was completely consumed.

EXAMPLE 3

This example demonstrates the efficacy of the anionic mineral feed concentrate granules for prevention of parturient paresis in commercial breeding dairy cows.

Tests were made by feeding 20 Holstein cows with two or more previous lactations, but which were dry. The feeding period for each cow commenced 21 days before the cows parturition date and ended at parturition. After parturition, the cows were managed and fed normally.

One group of 10 cows received feed ration free of anionic salt additives and the other received a feed ration containing 1 part of the concentrate of Example 1 to 50 parts of complete feed ration. With all aspects of the feed rations and conditions the same except the presence of the anionic concentrate from Example 1, the results of the comparative test are tabulated as follows:

| Treatment | None | Anionic Conc. Added |
| --- | --- | --- |
| Individuals in Test | 10 | 10 |
| Ca Conc. in Blood on Day of Calving, mg/ml | 0.31 | 0.47 |
| Individual Showing Signs of Parturient Paresis | 2 | 0 |

EXAMPLE 4

This example demonstrates that the anionic mineral feed concentrate granules are readily blended in substantial concentrations with high energy feed concentrates and remain palatable.

A high energy feed ration was formed by mixing 2.0 parts of rolled corn grain with 1.0 parts of the anionic concentrate of Example 1. Another high energy feed ration was prepared by blending only the inorganic anionic salts, amounting to the same as in the Example 1 product, with the rolled corn grain. The two feed concentrates were pelletized by a California Pellet Mill to ¼"' diameter pellets. The two types of high energy feed pellets were offered to 10 Holstein cows. The pellets prepared from the Example 1 product were readily consumed, but the pellets prepared from the inorganic anionic salts were almost completely refused by the cows.

I claim:

1. A four step method of preparing anionic mineral feed concentrate granules, which form storage stable blends with feed rations, for prevention of parturient paresis in commercial breeding animals, the method comprising;
    (a) metathetically reacting ammonium sulfate with a molecular excess of alkaline earth chlorides selected from the group consisting of magnesium chloride, calcium chloride, and mixtures thereof, to form an aqueous anionic salt solution comprising alkaline earth sulfate, ammonium chloride, and unreacted alkaline earth chloride;
    (b) admixing 1 part of the anionic salt solution with between 1 and 4 parts of comestible proteinaceous particles until the anionic salt solution is absorbed to form damp particles exhibiting moisture contents between 15 and 30 percent;
    (c) admixing a palatability enhancing molasses granule binder, amounting to between 1 and 8 percent of the mineral feed concentrate granules, with the damp particles until the particles are bound together as damp granules; and,
    (d) drying the granules to a moisture content between 3 and 15 percent at a temperature between 60 and 100° C. in a period of time amounting to less than 15 minutes.

2. The method of claim 1 wherein the ammonium sulfate is metathetically reacted with a molecular excess of the alkaline earth chloride magnesium chloride, in a molecular ratio of between 1.02 and 1.10 molecules of magnesium chloride to 1.00 molecule of ammonium sulfate.

3. The method of claim 1 wherein the ammonium sulfate is metathetically reacted with a molecular excess of the alkaline earth chlorides, magnesium and calcium chlorides, exhibiting magnesium to calcium molecular ratios between 2 and 100 to 1.

4. The method of claim 1 wherein the ammonium sulfate is metathetically reacted with a molecular excess of alkaline earth chloride in water which contains phosphoric acid amounting to between 0.2 and 1.0 percent of the mineral feed concentrate granules.

5. The method of claim 1 wherein ammonium sulfate is reacted with a molecular excess of alkaline earth chloride in water which amounts to a total of between 30 and 60 percent of the anionic salt solution formed.

6. The method of claim 1 wherein ammonium sulfate is reacted with a molecular excess of alkaline earth chloride in water at a temperature between 50 and 100° C. for a period of time between 3 and 30 minutes.

7. The method of claim 1 wherein 1 part of anionic salt solution is admixed with between 1.6 and 2.0 parts of comestible proteinaceous feed particles until the salt solution is absorbed to form damp particles exhibiting moisture contents between 18 and 23 percent.

8. The method of claim 1 wherein the comestible proteinaceous feed particles exhibit diameters between 0.2 and 2.0 millimeters.

9. The method of claim 1 wherein the comestible proteinaceous particles comprise protein amounting to between 10 and 20 percent of the mineral feed concentrate granules.

10. The method of claim 1 wherein the comestible proteinaceous particles are selected from the group consisting of distillers grain, brewers grain, corn gluten meal, dehydrated alfalfa, cell wall concentrates from microbial processes, wheat middlings, and soybean hulls.

11. The method of claim 1 wherein the palatability enhancing molasses binder exhibits dry matter contents between 60 and 94 percent.

12. The method of claim 1 wherein the palatability enhancing molasses binder is selected from the group consisting of sugar beet molasses, cane molasses, citrus molasses, wood molasses, and recycled industrial sugar molasses.

13. The method of claim 1 wherein the palatability enhancing molasses binder amounts to between 1 and 4 percent of the mineral feed concentrate granules.

14. The method of claim 1 wherein the damp granules are dried to a moisture content between 5 and 10 percent.

15. The method of claim 1 wherein the damp granules are dried so that the temperature of the mineral feed concentrate granules does not exceed 80° C.

16. A palatable anionic mineral feed concentrate granule composition which forms storage stable blends with feed rations for feeding to commercial breeding animals for prevention of parturient paresis prepared by the method of claim 1.

17. The composition of claim 16 wherein the commercial breeding animals are selected from the group consisting of cattle, sheep, goats, horses, and swine.

18. A continuous four step method of preparing a granular palatable anionic mineral feed concentrate composition which forms storage stable blends with feed rations for prevention of parturient paresis in commercial breeding animals, the method comprising:
 (a) metathetically reacting ammonium sulfate and magnesium chloride in a ratio of 1.00 molecule of ammonium sulfate to between 1.02 and 1.10 molecules of magnesium chloride, the magnesium chloride being a component of a salt mixture, which contains calcium chloride, potassium chloride, and sodium chloride amounting in total to between 0.5 and 5.0 percent of the magnesium chloride, in water containing phosphoric acid amounting to between 0.2 and 1.0 percent of the anionic mineral feed concentrate, at a temperature between 50 and 100° C., until the ammonium sulfate reacts with the magnesium chloride to form an anionic salt solution comprising ammonium chloride, magnesium sulfate, and unreacted magnesium chloride;
 (b) continuously admixing 1.0 part of the anionic salt solution with between 1.6 and 3.0 parts of comestible proteinaceous particles exhibiting diameters between 0.25 and 0.85 millimeters, for a period of time between 4 and 18 minutes at a temperature between 30 and 70° C. until damp mineral concentrate particles are formed exhibiting moisture contents between 18 and 23 percent;
 (c) continuously admixing a palatability enhancing molasses granule binder amounting to between 1 and 3 percent of the mineral feed concentrate granules, with the damp mineral concentrate particles until the damp mineral concentrate particles are bound together by the molasses granule binder to form damp granules, in a period of time amounting to between 2 and 4 minutes; and,
 (d) drying the damp granules to a moisture content of between 5 and 15 percent by means of a continuous dryer wherein granules temperatures do not exceed 96° C., to provide an anionic mineral feed concentrate granular composition exhibiting an excess of the strong anions chloride and sulfate over the strong cations sodium and potassium, amounting to between 5.5 and 8.0 milliequivalents per gram of mineral feed concentrate granules.

19. The method of claim 18 wherein the amount of phosphoric acid added in the water, in which the anionic salt solution is formed, is sufficient to provide a pH of between 5.0 and 6.5 in the mineral feed concentrate granules.

20. The method of claim 18 wherein the comestible proteinaceous particles contain between 2 and 10 percent of conditioners selected from the group consisting of calcium sulfate, magnesium sulfate, diatomaceous earth, Bentonite, and clay.

21. The method of claim 18 wherein the continuous admixing of the anionic salt solution and the palatability enhancing molasses granule binder with the comestible proteinaceous particles is performed in a horizontal mixing cylinder containing one, or more, mixing blades, mounted on a central rotating shaft, which throws all mixer contents toward the center of the cylinder, thereby creating a fluidized bed of particles which contains a homogeneous blend of all of the mixer contents, the cylinder also being equipped with a dam at its discharge end to control the level retained in the cylinder, and one, or more, chopper blades mounted on the side wall of the cylinder, the chopper blades operating perpendicularly to the mixing blades to chop agglomerated granules until they exhibit diameters between 0.5 and 1.5 mm.

22. The method of claim 18 wherein the continuous dryer is selected from the group of dryers consisting of rotary drum dryer, vibratory fluid bed dryer, hot air fluid bed dryer, vacuum dryer, spray dryer, and steam tube dryer.

23. The method of claim 18 wherein the anionic salt solution is admixed with comestible proteinaceous particles so that the protein content of the mineral feed concentrate amounts to between 10 and 20 percent and the NPN protein equivalent content amounts to between 20 and 30 percent.

24. The method of claim 18 wherein a part of the dry mineral feed concentrate granules, amounting to between 20 and 60 percent of the concentrate granules, are comminuted to particles exhibiting diameters between 0.25 and 0.85 millimeters and recycled as a portion of the comestible proteinaceous particles.

25. A caramelization-free anionic mineral feed concentrate granule composition, which forms storage stable blends with feed rations and is effective for feeding to breeding cows to prevent parturient paresis, prepared by the method of claim 18.

* * * * *